United States Patent [19]

Matsuda et al.

[11] Patent Number: 5,504,658
[45] Date of Patent: Apr. 2, 1996

[54] REMOTE CONTROL PLUG UNIT CARRYING A BATTERY

[75] Inventors: Takeshi Matsuda; Hiroshi Yokozawa; Harumi Kanou, all of Tokyo, Japan

[73] Assignee: SMK Corporation, Tokyo, Japan

[21] Appl. No.: 167,769

[22] Filed: Dec. 15, 1993

[30] Foreign Application Priority Data

Dec. 16, 1992 [JP] Japan ................. 4-091467 U

[51] Int. Cl.$^6$ ............. H04B 1/03; H04B 1/034; H05K 7/10; H05K 7/12
[52] U.S. Cl. ............ 361/814; 361/807; 361/809; 361/811; 429/96; 429/100; 439/500; 439/620; 439/515
[58] Field of Search ............ 361/636, 807, 361/809, 811, 820, 821, 833, 814; 429/96, 98, 99, 100; 439/500, 620, 894, 915; 360/137; 307/150

[56] References Cited

U.S. PATENT DOCUMENTS

| | | | |
|---|---|---|---|
| 4,784,926 | 11/1988 | Sato | 429/96 |
| 4,868,074 | 9/1989 | Omori et al. | 429/98 |
| 5,186,652 | 2/1993 | Hai-Yung | 439/500 |
| 5,193,220 | 3/1993 | Ichinohe et al. | 429/98 |
| 5,243,510 | 9/1993 | Cheney, II | 439/620 |

*Primary Examiner*—Donald A. Sparks
*Attorney, Agent, or Firm*—Christopher R. Pastel; Thomas R. Morrison

[57] ABSTRACT

In an arrangement in which the earphone cord 16 of earphones 15 is connected to a remote control unit 11 and the remote control cord 12 of this remote control unit 11 is detachably connected to a portable audio unit 10 by means of a plug 14, a battery 19 that drives the elements inside the remote control unit 11 is embodied in a plug unit 13 having the plug 14. Specifically, a battery accommodation recess 23 is formed in the plug unit 13, and a battery holder 26 into which the battery 19 is fitted is detachably attached to this battery accommodation recess 23. As a result, with the plug 14 inserted into the portable audio unit 10, the portable audio unit 10 and the plug unit 13 are an integral unit and do not have the weight of the remote control unit 11 if the portable audio unit 10 is kept in a pocket or handbag. The remote control unit 11 becomes lighter and smaller to the extent of the battery 19.

10 Claims, 3 Drawing Sheets

REMOTE CONTROL PLUG UNIT CARRYING A BATTERY

BACKGROUND OF THE INVENTION

The present invention relates to a remote control unit for a small-size portable audio unit such as a portable CD or portable tape recorder and, more particularly, to a remote control unit which can be made more compact and lighter than heretofore.

As depicted in FIG. 4, a set of earphones 15 can be detachably connected via an intervening remote control unit 11 by a plug 14 of a plug unit 13 at the end of an earphone cord 16 to a particularly small-size portable audio unit 10 such as a portable CD or portable tape recorder. When in use, the portable audio unit 10 is placed in a pocket or handbag and the earphones 15 are inserted into the ears. When this is done, the earphone cord 16 is left dangling from the ears.

A remote control unit 11 is connected to the portable audio unit 10 via a remote control cord 12. This remote control unit 11 has a volume knob 21, an on/off switch, and operation buttons 22 such as a play/pause knob and a stop knob, and allows remote control of the audio unit.

The operation setting of the volume knob 21 and operation buttons 22 is not affected when plug unit 13 is pulled out of the portable audio unit 10 and re-inserted. A display unit 20 can be embodied into the remote control unit 11. If it is arranged that electric power is supplied from the portable audio unit 10 when the plug 14 is inserted in the portable audio unit 10, sometimes there are no problems in the case of display of channel changes or display of the volume, but when the display unit is given the function of a clock, a button battery 19 must be embodied into the remote control.

The problem is that inclusion of the battery in the remote control unit makes the shape and size of the remote control unit 11 larger and heavier than is desirable. Since the remote control unit 11 dangles from the earphones 16, such condition of a bulkier, heavier remote control unit hanging from the user can be annoying.

OBJECTS AND SUMMARY OF THE INVENTION

Accordingly, it is an object of the invention to provide a remote control unit for a portable audio unit which overcomes the drawbacks of the prior art.

It is a further object of the invention to provide a remote control unit for a portable audio unit which is more compact and lighter than remote control units presently available.

It is a still further object of the invention to provide a remote control unit for a portable audio unit in which a battery for supplying power to power requiring devices in the remote control unit is carried in a plug unit at the audio unit so that less weight of the support of the remote control unit from an earphone cord is apparent to the user and, therefore, more comfortable to use.

Briefly stated, there is provided an arrangement in which an earphone cord of earphones connected to a remote control unit and a remote control unit remote control cord is detachably connected to a portable audio unit by means of a plug. A battery that drives power operated elements inside the remote control unit is embodied in a plug unit carrying the plug. A battery accommodation recess is formed in the plug unit, and a battery holder into which the battery is fitted is removably received to this battery accommodation recess. As a result, with the plug inserted into the portable audio unit and these kept in a pocket or handbag by a user, the remote control unit becomes lighter and smaller in use since it does not have a battery therein.

In accordance with these and other objects of the invention, there is provided a remote control unit for a portable audio unit, the remote control unit having a housing in which operating elements including a functioning device requiring steady supply of electric power thereto are received. A remote control cord carrying a plug connects the remote control unit housing to the audio unit, and a jack is provided in the housing for removably receiving an ear phone plug. The plug for connecting the remote control unit to the audio unit is carried in a plug unit, and the plug unit carries an electric power supply source therein for uninterruptedly supplying electric power to the functioning device.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 4:
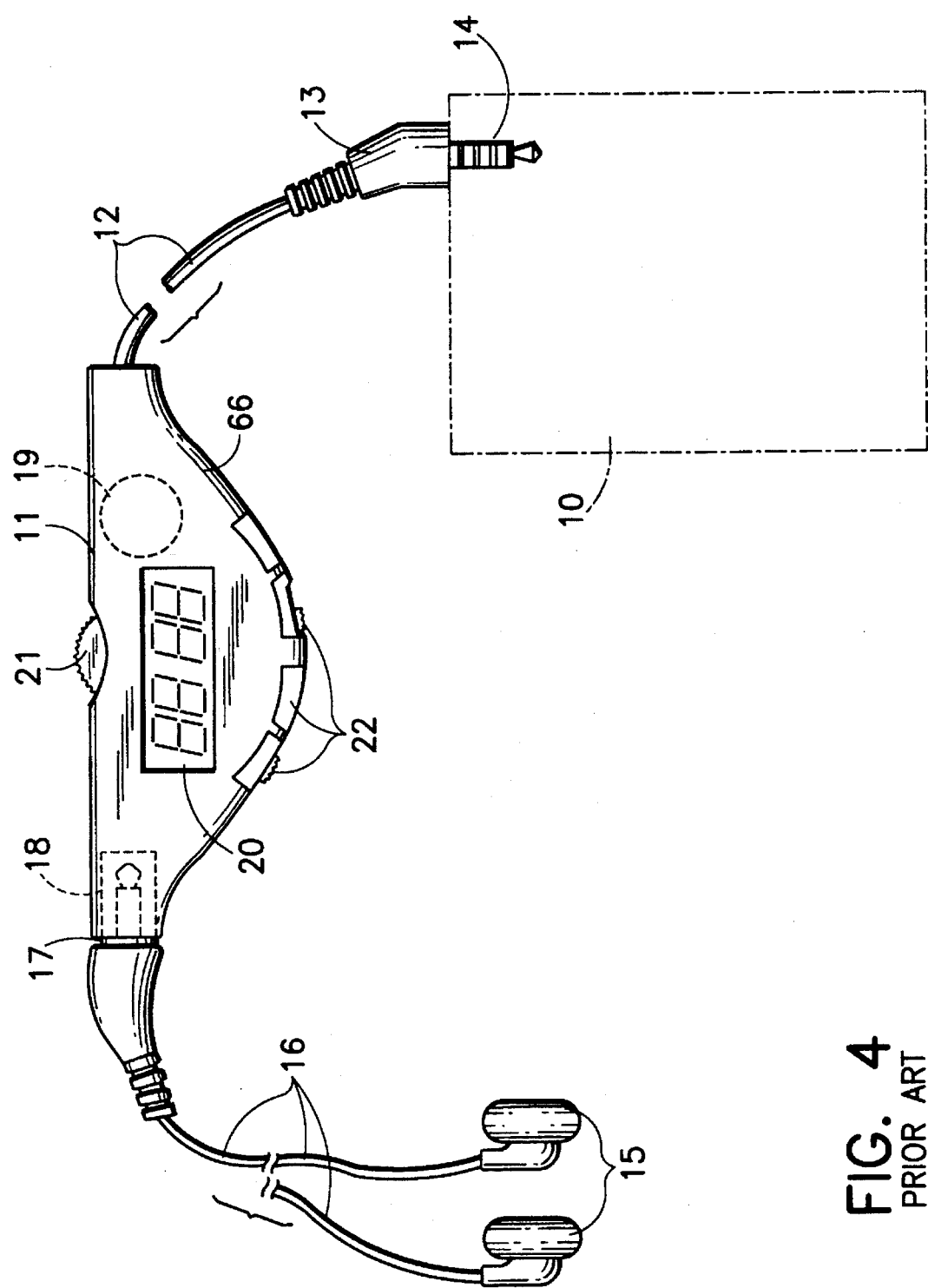
FIG. 4 is a front view of a conventional portable audio unit with remote control.

The prior art remote control unit 11 depicted in FIG. 4 is in a state where it is connected integrally at all times, via a remote control cord 12, with a plug unit 13 carrying a plug 14. The portable audio unit 10 is detached by pulling out the plug 14, and the earphones 15 are likewise detached from the remote control unit 11 by pulling out plug 17 from earphone jack 18. But the plug unit 13 having plug 14 for connection to the portable audio unit 10 is at all times electrically connected to the remote control unit 11 via the remote control cord 12.

Figure 1:
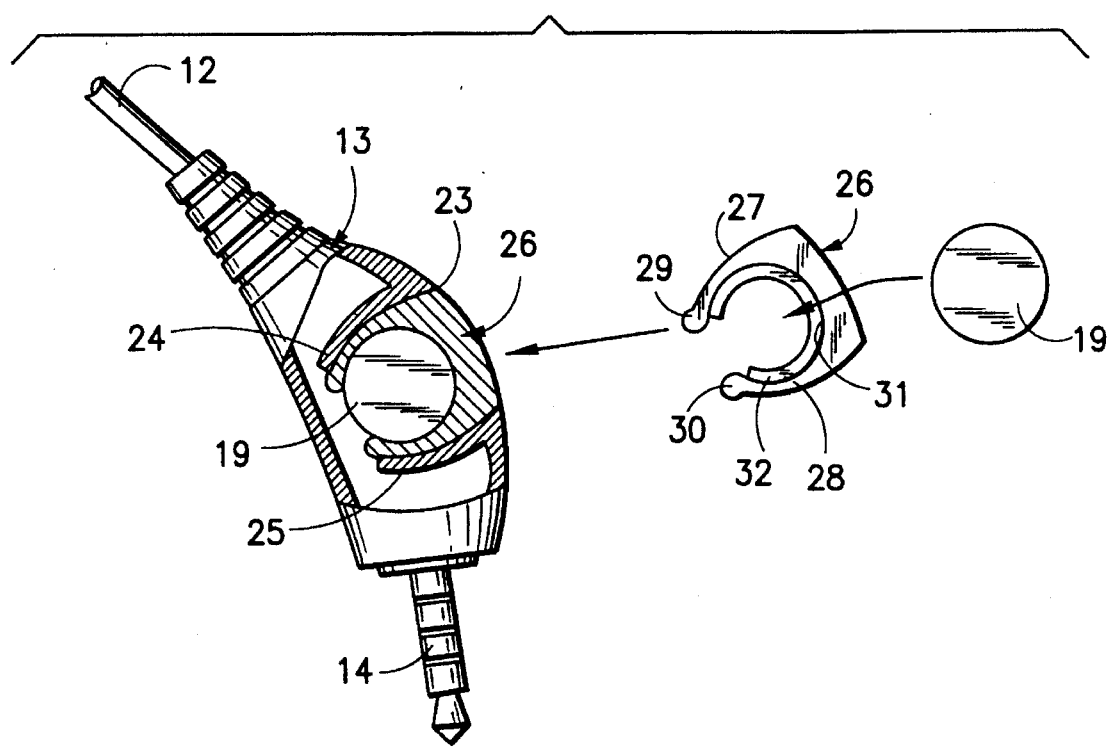
FIG. 1 is a front view, with a portion cut away, showing a first embodiment of the remote control for a portable audio unit made in accordance with the invention.
Figure 2:
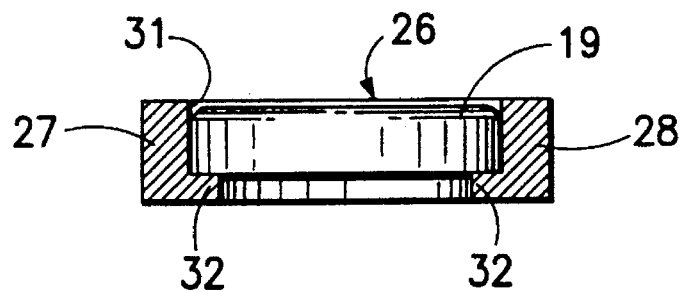
FIG. 2 is a cross-section view on enlarged scale showing the manner in which a button battery is held in the battery holder.
Figure 3:
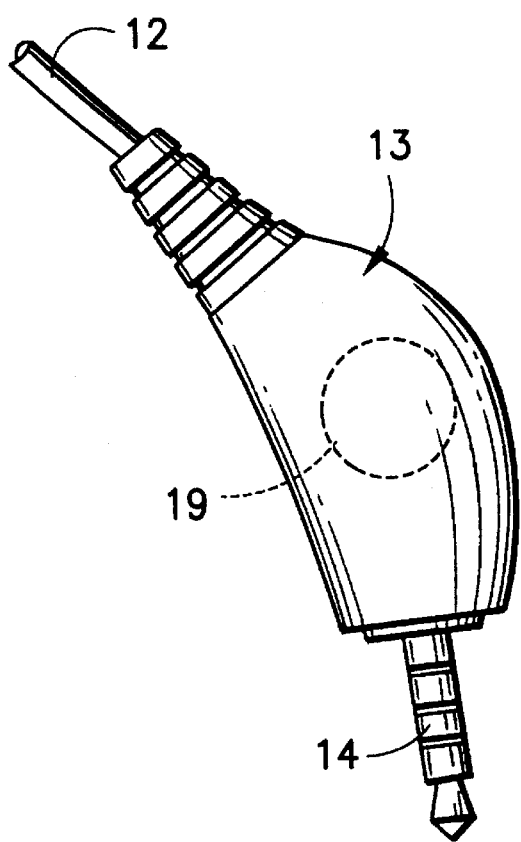
FIG. 3 is a front view of the plug unit in which the battery plug is molded about the battery thereby permanently fixing the battery in the plug unit audio unit is carried.

FIGS. 1 through 3 show where, in accordance with this invention, the button battery 19 previously embodied into the housing 66 of the remote control unit 11, is accommodated in the plug unit 13 at the end of the remote control cord 12.

Referring to FIGS. 1 and 2, it is seen that the button battery 19 is replaceable, and a battery accommodation recess 23 is provided in the side of the plug unit 13. This battery accommodation recess 23 has side wall parts 24 and 25 on both sides, and these side wall parts 24 and 25 are shaped so as to form a gap where the tips are somewhat narrowed and an opening is formed between the tips of the side wall parts 24 and 25. Also, positive and negative electrodes (not shown) are arranged facing each other between the top and bottom of this battery accommodation recess 23.

A battery holder 26 into which the button battery 19 fits is press-fitted into said battery accommodation recess 23. In this battery holder 26, elastic narrow-width U-shaped pincer prongs 27 and 28 are provided. A battery inlay hole 31 is formed with a battery retaining ledge 32 in the middle of these pincer prongs 27 and 28, and retention prong tip end parts 29 and 30 are formed integrally at the ends of these pincer prongs 27 and 28.

In this configuration, when a button battery 19 is fitted into the battery inlay hole 31 of the battery holder 26 from above, the button battery 19 is held on the battery retaining ledge 32. In this state, the battery holder 26 is inserted into the battery accommodation recess 23 of the plug unit 13 and the battery and holder are removably receivable in the plug unit.

Because the retention prong tip end parts 29 and 30 come into contact with the side wall parts 24 and 25, when it is pushed in farther the tips of the pincer prongs 27 and 28 bend inward somewhat, and when pressed in even farther the retention protrusions 29 and 30 ride past the ends of the side wall parts 24 and 25 and engage behind the wall parts thereby to secure the holder in the recess.

The external surface of the battery holder and the envelope of the plug unit recess are structurally complementally configured.

FIG. 3 shows an example in which a button battery 19 is integrally molded with the plug unit 13 structure. In this case, the button battery 19 cannot be replaced, but it can be used for several years by keeping the power consumption of the display unit 20 as small as possible.

The battery 19 is not limited to the button type. And what is provided in the remote control unit 11 and driven by the built-in battery 19 is not limited to the display unit 20 but may be any power requiring electrical component in general.

In this invention, because as described above the battery 19 for driving the display unit 20, which requires uninterrupted steady supply of electric power, and other elements provided on the remote control unit 11 is embodied into the plug unit 13 having a plug 14, with plug 14 inserted into the portable audio unit 10, the portable audio unit 10 and the plug unit 13 form an integral unit, and if the portable audio unit 10 is kept in a pocket or handbag, it does not have the weight of a prior art remote control unit 11. The remote control unit 11 is a lighter and smaller type to the extent of non presence of a battery 19.

A battery accommodation recess 23 is formed in the plug unit 13, and by removing the battery holder 26 into which the battery 19 is fitted, the battery 19 can be replaced.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a remote control unit for a portable audio unit, the remote control unit having a housing in which operating elements including a functioning device requiring steady supply of electric power thereto are received, and an earphone cord connected to the remote control unit and carrying an earphone, there being a remote control cord carrying a plug for connecting the remote control unit housing to the audio unit, the plug for connecting the remote control unit to the audio unit being carried in a plug unit, the plug unit carrying an electric power supply source therein for uninterruptedly supplying electric power to the functioning device.

2. The remote control unit of claim 1 in which the electric power source is a battery, the battery being mounted in a recess in the plug unit.

3. The remote control unit of claim 2 in which the battery is carried in a holder, the holder being received in the plug unit recess.

4. The remote control unit of claim 3 in which an external surface of the battery holder and an envelope of the plug unit recess are structurally complementally configured.

5. The remote control unit of claim 3 in which the battery is fixed to the plug unit.

6. The remote control unit of claim 5 in which the battery is fixed to the plug unit by molding the plug unit structure about the battery.

7. The remote control unit of claim 2 in which the battery holder is removably receivable in the plug unit recess.

8. The remote control unit of claim 7 in which the battery holder includes elastic prong elements having prong tip end parts which engage behind wall parts in the plug unit recess with the holder inserted in said recess to secure the holder in the recess.

9. The remote control unit of claim 2 in which the battery is removably receivable in the battery holder.

10. The remote control unit of claim 1 in which the earphone cord carries a plug, and the plug is received in a jack in the remote control unit.

\* \* \* \* \*